United States Patent
Hanafusa

(10) Patent No.: US 9,660,442 B2
(45) Date of Patent: May 23, 2017

(54) FREQUENCY REGULATION METHOD

(71) Applicant: Panasonic Intellectual Property Management Co., Ltd., Osaka (JP)

(72) Inventor: Hiroshi Hanafusa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 500 days.

(21) Appl. No.: 14/112,352

(22) PCT Filed: Mar. 8, 2013

(86) PCT No.: PCT/JP2013/001492
§ 371 (c)(1),
(2) Date: Oct. 17, 2013

(87) PCT Pub. No.: WO2013/132872
PCT Pub. Date: Sep. 12, 2013

(65) Prior Publication Data
US 2014/0052308 A1    Feb. 20, 2014

(30) Foreign Application Priority Data
Mar. 8, 2012    (JP) .................................. 2012-052180

(51) Int. Cl.
*G05D 3/12*    (2006.01)
*H02J 1/00*    (2006.01)
(Continued)

(52) U.S. Cl.
CPC .................. *H02J 1/00* (2013.01); *G05F 1/66* (2013.01); *H02J 3/14* (2013.01); *H02J 3/32* (2013.01);
(Continued)

(58) Field of Classification Search
CPC .. H02J 1/00; H02J 13/0079; H02J 3/14; H02J 3/32; G05F 1/66
(Continued)

(56) References Cited

U.S. PATENT DOCUMENTS

| 5,642,101 A | * | 6/1997 | Stirk | ......................... H02G 3/00 |
| | | | | 340/12.32 |
| 8,401,712 B2 | | 3/2013 | Shimoda et al. | |

(Continued)

FOREIGN PATENT DOCUMENTS

| EP | 2 267 867 | 12/2010 |
| JP | 2003-92829 | 3/2003 |

(Continued)

OTHER PUBLICATIONS

Extended European Search Report issued Mar. 11, 2015 in corresponding European patent application No. 13758068.4.

(Continued)

*Primary Examiner* — Robert Fennema
*Assistant Examiner* — Thomas Stevens
(74) *Attorney, Agent, or Firm* — Wenderoth, Lind & Ponack, L.L.P.

(57) ABSTRACT

A frequency regulation method for a grid which is performed by a control device that connects, through a communication network, a controller for controlling at least one load device and a storage battery. The frequency regulation method including: obtaining, when it is detected that a frequency of a grid deviates from a predetermined range, an instruction signal including a power instruction value for keeping the frequency of the grid within the predetermined range; and generating a control signal for controlling the load device when the load device is operable in accordance with the instruction signal, and transmitting the control signal to the controller, and generating a control signal for (Continued)

charging or discharging the storage battery when the load device is not operable in accordance with the instruction signal, and transmitting the control signal to the storage battery.

15 Claims, 12 Drawing Sheets

(51) Int. Cl.
    *H02J 3/32* (2006.01)
    *G05F 1/66* (2006.01)
    *H02J 3/14* (2006.01)
    *H02J 13/00* (2006.01)
    *H02J 3/00* (2006.01)

(52) U.S. Cl.
    CPC ..... *H02J 13/0079* (2013.01); *H02J 2003/003* (2013.01); *Y02B 90/222* (2013.01); *Y02E 60/722* (2013.01); *Y04S 10/14* (2013.01); *Y04S 10/54* (2013.01); *Y04S 20/12* (2013.01); *Y10T 307/344* (2015.04)

(58) Field of Classification Search
    USPC .......................................................... 700/295
    See application file for complete search history.

(56) References Cited

U.S. PATENT DOCUMENTS

| | | | |
|---|---|---|---|
| 2007/0021874 A1 | 1/2007 | Rognli et al. | |
| 2007/0220907 A1* | 9/2007 | Ehlers | F25B 49/005 62/126 |
| 2008/0048854 A1* | 2/2008 | Olsen | H04M 9/08 340/531 |
| 2010/0017045 A1* | 1/2010 | Nesler | B60L 11/1824 700/296 |
| 2010/0088261 A1* | 4/2010 | Montalvo | H02J 3/14 706/15 |
| 2010/0167659 A1* | 7/2010 | Wagner | G01D 4/008 455/67.11 |
| 2010/0235008 A1* | 9/2010 | Forbes, Jr. | G06Q 10/00 700/291 |
| 2010/0328023 A1 | 12/2010 | Thomson | |
| 2011/0022239 A1* | 1/2011 | Forbes, Jr. | G06Q 10/00 700/286 |
| 2011/0077792 A1 | 3/2011 | Shimoda et al. | |
| 2012/0048854 A1* | 3/2012 | Lin | B65F 1/1638 220/211 |
| 2012/0166835 A1* | 6/2012 | Boss | G06Q 50/06 713/320 |
| 2014/0316592 A1* | 10/2014 | Haj-Maharsi | F03D 7/0284 700/287 |

FOREIGN PATENT DOCUMENTS

| | | |
|---|---|---|
| JP | 2003-284244 | 10/2003 |
| JP | 2007-151371 | 6/2007 |
| JP | 2011-055671 | 3/2011 |
| JP | 2011-234563 | 11/2011 |

OTHER PUBLICATIONS

Xing Zhang et al: "Analysis and Control of Energy Storage Systems in Microgrid", Intelligent System Design and Engineering Application (ISDEA), 2012 Second International Conference on, IEEE, Jan. 6, 2012, pp. 1375-1379, XP032155272.

International Search Report issued Jun. 4, 2013 in International (PCT) Application No. PCT/JP2013/001492, 1 page.

* cited by examiner

FIG. 3

| User ID | Type of device | Operating data | | | Device use schedule (status of use ON / OFF) | Intention of user to participate (Yes/No) |
|---|---|---|---|---|---|---|
| | | Characteristic data during operation | Rating (output or input) | Cost (life) | | |
| ID01 | Storage battery | ⎍⎍⎍ | A1 | 100 | ON | Yes |
| | Power generator | ◠ | A2 | 80 | OFF | |
| | Pump | ◠ | A3 | 50 | OFF | |
| | Heater | ◠ | A4 | 40 | ON | |
| | Refrigerator | ◠ | A5 | 50 | OFF | |

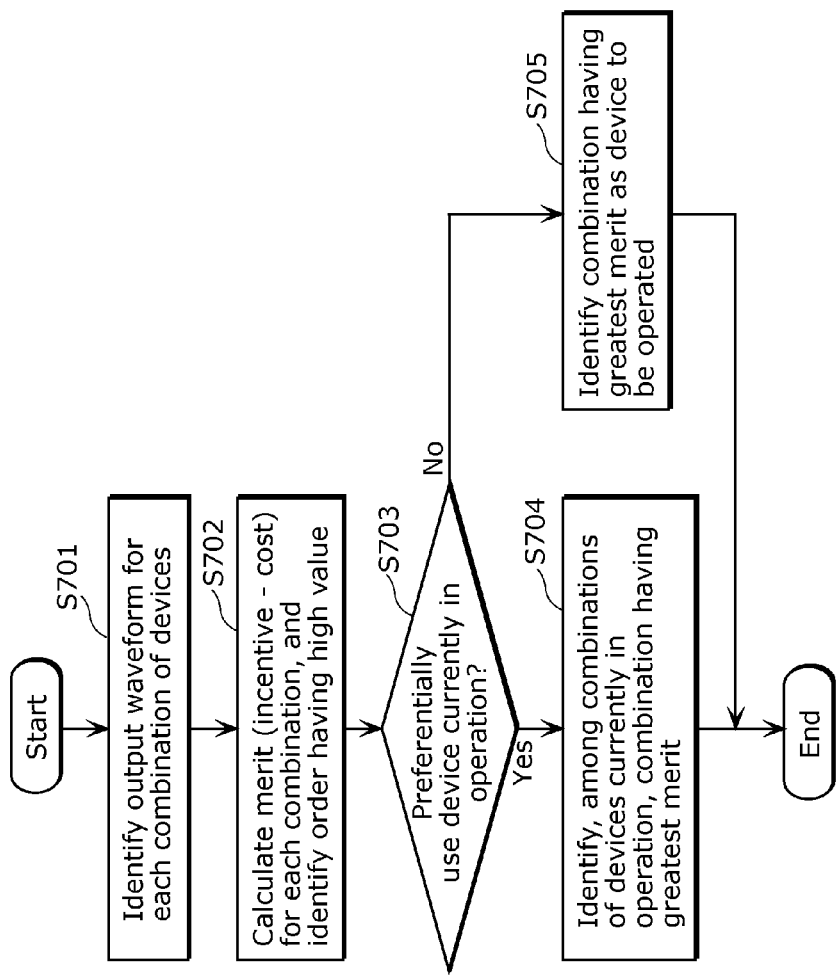

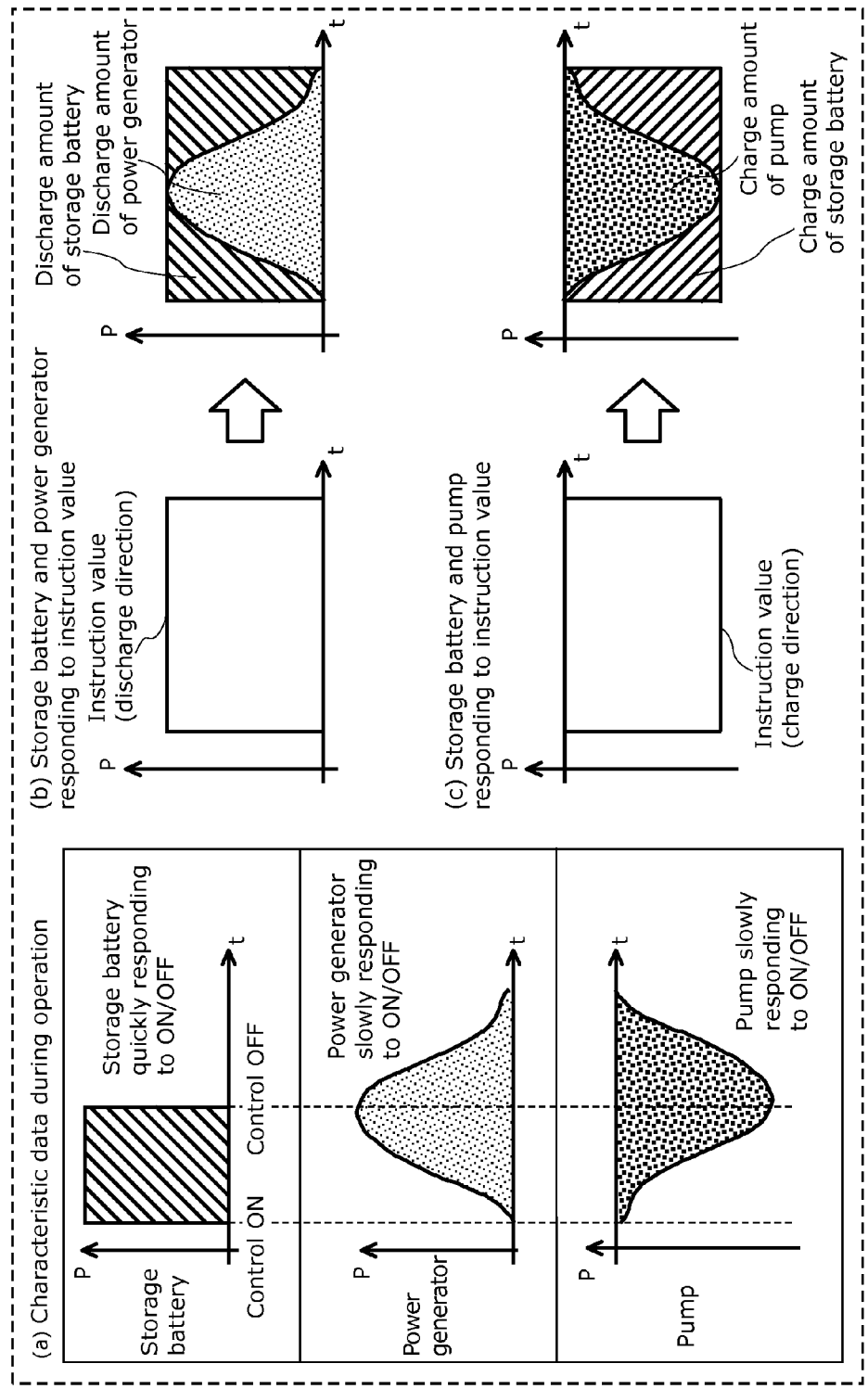

FREQUENCY REGULATION METHOD

TECHNICAL FIELD

The present invention relates to a frequency regulation method for determining, among load devices and storage batteries of power users, a device to be operated for stabilizing a frequency of a grid.

BACKGROUND ART

A technique for stabilizing a frequency of a grid by using a storage battery (Frequency Regulation (hereinafter, referred to as "FR")) has been disclosed so far. A storage battery has a higher response speed for a frequency change than a conventional power generator, and thus the storage battery has the advantage of enhancing conformity to the frequency change (see Patent Literature (PLT) 1, for instance).

CITATION LIST

Patent Literature

[PLT 1] Japanese Unexamined Patent Application Publication No. 2011-234563

SUMMARY OF INVENTION

Technical Problem

However, the storage battery usually deteriorates progressively with an increase in the number of times the storage battery is charged or discharged, and thus the deterioration is accelerated by repeatedly charging or discharging the storage battery to stabilize a frequency of a grid. As a result, the life of the storage battery is shortened.

In response, the present invention provides a frequency regulation method which makes it possible to reduce the number of times a storage battery is charged or discharged, to stabilize a frequency of a grid.

Solution to Problem

A frequency regulation method according to an aspect of the present invention is a frequency regulation method for a grid which is performed by a server that connects, through a communication network, a controller for controlling at least one load device and a storage battery system, the frequency regulation method including: obtaining, when it is detected that a frequency of a grid deviates from a predetermined range, an instruction signal including a power instruction value for keeping the frequency of the grid within the predetermined range; and generating a control signal for controlling the load device when the load device is operable in accordance with the instruction signal, and transmitting the control signal to the controller, and generating a control signal for charging or discharging the storage battery system when the load device is not operable in accordance with the instruction signal, and transmitting the control signal to the storage battery system.

These general and specific aspects may be implemented using a system, a method, an integrated circuit, a computer program, or a computer-readable recording medium such as CD-ROM, or any combination of systems, methods, integrated circuits, computer programs, or recording media.

Advantageous Effects of Invention

According to the frequency regulation method in the present invention, since, in the case where a frequency of a grid is regulated using a storage battery, the storage battery is not charged or discharged when the frequency of the grid can be stabilized by causing a load device to operate, it is possible to reduce the number of times the storage battery is used.

BRIEF DESCRIPTION OF THE DRAWINGS

FIG. 3 is a diagram showing exemplary data stored in a memory of the frequency regulation device according to Embodiment 1 of the present invention.

FIG. 8A is a flow chart showing processing of a frequency regulation device according to Modification 2 of Embodiment 1 of the present invention.

FIG. 8B is an explanatory diagram showing processing of a frequency regulation device according to Modification 4 of Embodiment 1 of the present invention.

Figure 1:
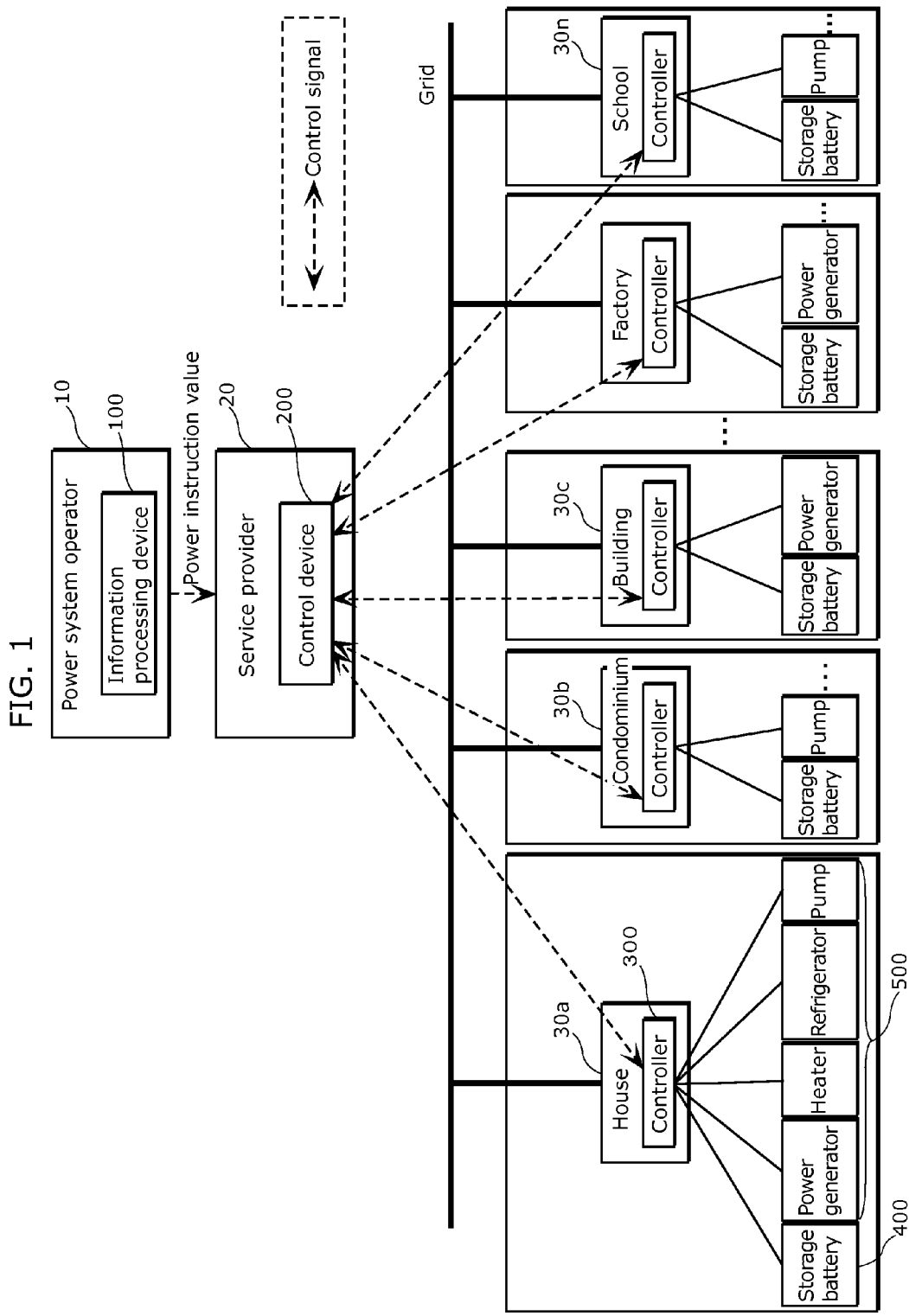
FIG. 1 is an exemplary configuration diagram showing a system including a frequency regulation device according to Embodiment 1 of the present invention.

DESCRIPTION OF EMBODIMENTS (Underlying Knowledge Forming Basis of Present Invention)

In relation to the technique for stabilizing a frequency of a grid disclosed in the Background Art section, the inventors have found the following problem.

A technique for stabilizing a frequency of a grid by using a power generator such as a gas turbine has been examined so far. However, when a frequency is stabilized using a gas turbine or the like, it is necessary to cause a power generator to generate power more than necessary to conform to a power instruction value for suppressing a frequency change of a grid, because a response speed when the gas turbine is operated is slow.

Moreover, when the frequency is stabilized by causing the power generator such as the gas turbine to operate, it is difficult to address an instantaneous (sudden) frequency change in the case where such a frequency change occurs in the grid, because a response speed of the power generator at a time of operation is slow.

A technique for stabilizing a frequency of a grid by using a storage battery has been disclosed so far. Since a storage battery has a high response speed for charging or discharging, conformity of the storage battery to a power instruction value is better when a frequency change is suppressed by charging or discharging the storage battery. This results in higher power efficiency when the frequency of the grid is stabilized (see PTL 1, for instance).

However, the storage battery usually deteriorates progressively with an increase in the number of times the storage battery is charged or discharged, and thus the deterioration is accelerated by repeatedly charging or discharging the storage battery to stabilize the frequency of the grid. As a result, the life of the storage battery is shortened.

In order to solve such a problem, a frequency regulation method according to an aspect of the present invention is a frequency regulation method for a grid which is performed by a server that connects, through a communication network, a controller for controlling at least one load device and a storage battery system, the frequency regulation method including: obtaining, when it is detected that a frequency of a grid deviates from a predetermined range, an instruction signal including a power instruction value for keeping the frequency of the grid within the predetermined range; and generating a control signal for controlling the load device when the load device is operable in accordance with the instruction signal, and transmitting the control signal to the controller, and generating a control signal for charging or discharging the storage battery system when the load device is not operable in accordance with the instruction signal, and transmitting the control signal to the storage battery system.

With this, it is possible to determine whether or not the frequency of the grid can be kept within the predetermined range by causing the load device to operate, and stabilize the frequency of the grid by charging or discharging the storage battery system only when the frequency of the grid cannot be kept within the predetermined range. As a result, it is possible to reduce the number of times the storage battery system is charged or discharged.

For instance, the frequency regulation method includes controlling the load device when a cycle in which power corresponding to the power instruction value is exchanged with the grid is greater than or equal to a predetermined value, and charging or discharging the storage battery system when the cycle is less than the predetermined value.

For example, the frequency regulation method includes controlling the load device upon obtaining the instruction signal, and causing the storage battery system to charge or discharge differential power relative to the power instruction value when the differential power is present relative to the power instruction value even in the case where the load device is controlled in a period when power corresponding to the power instruction value is exchanged between the load device and the grid.

For instance, the frequency regulation method includes controlling the load device to cause a remaining battery level of the storage battery system at an end of a frequency regulation period to reach a predetermined target value, the frequency regulation period being a period when a frequency of the grid is regulated.

For example, the frequency regulation method includes controlling the load device to cause the remaining battery level of the storage battery system at the end of the frequency regulation period to reach the predetermined target value, by controlling the load device to compensate power conversion loss of the storage battery system in the frequency regulation period.

For instance, in the frequency regulation method, the predetermined target value is a remaining battery level of the storage battery system at a start of the frequency regulation period, and the control unit controls the load device to cause the remaining battery levels of the storage battery system at the start and end of the frequency regulation period to be equal.

For example, in the frequency regulation method, the controller controls a plurality of the load devices, and the server previously stores information about respective power characteristics of each of the load devices, and the frequency regulation method includes determining whether or not each load device is operable in accordance with the instruction signal using power characteristics obtained by combining the power characteristics of the load devices.

For instance, the frequency regulation method includes: setting an incentive which is to be offered to a user of the load device to be higher for a higher degree of approximation between the power characteristics of the load device and a waveform of the instruction signal; and selecting a combination of load devices having a highest incentive.

For example, the frequency regulation method includes: setting an incentive which is to be offered to a user of the load device to be higher for a higher degree of approximation between the power characteristics of the load device and a waveform of the instruction signal; and charging or discharging the storage battery system when the incentive is less than a predetermined threshold value.

For instance, in the frequency regulation method, the load device is at least one of a household appliance, an electric vehicle, a power generator, a pump, a heater, and a refrigerator, and controlling of the load device includes decreasing and increasing an amount of power consumption by the load device.

A server according to another aspect of the present invention is a server which connects, through a communication network, a controller for controlling at least one load device and a storage battery system, the server including: a communicating unit configured to communicate with the controller and the storage battery system; an obtaining unit configured to obtain, when it is detected that a frequency of a grid deviates from a predetermined range, an instruction signal including a power instruction value for keeping the frequency of the grid within the predetermined range; and a control unit configured to (i) generate a control signal for controlling the load device when the load device is operable in accordance with the instruction signal, and transmit the generated control signal to the controller and the storage battery system through the communicating unit, and (ii) generate a control signal for charging or discharging the storage battery system when the load device is not operable in accordance with the instruction signal, and transmit the generated control signal to the controller and the storage battery system through the communicating unit.

A frequency regulation system according to a further aspect of the present invention is a frequency regulation system including a storage battery system and a server which connects, through a communication network, a controller for controlling at least one load device and the storage battery system, wherein the server includes: a communicating unit configured to communicate with the controller and the storage battery system; an obtaining unit configured to obtain, when it is detected that a frequency of a grid deviates from a predetermined range, an instruction signal including a power instruction value for keeping the frequency of the grid within the predetermined range; and a control unit configured to generate a control signal for controlling the load device when the load device is operable in accordance with the instruction signal, generate a control signal for charging or discharging the storage battery system when the load device is not operable in accordance with the instruction signal, and transmit the generated control signal to the controller and the storage battery system through the communicating unit, and the storage battery system includes: a storage battery; a receiving unit configured to receive the control signal; and a control unit configured to control charging or discharging of the storage battery based on the received control signal.

These general and specific aspects may be implemented using a system, a method, an integrated circuit, a computer program, or a computer-readable recording medium such as CD-ROM, or any combination of systems, methods, integrated circuits, computer programs, or recording media.

The following describes in detail embodiments with reference to the drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

[1. Configuration]
(System Configuration Diagram)

FIG. 1 is a configuration diagram showing a system in which a frequency regulation device according to Embodiment 1 of the present invention is used. A system shown in FIG. 1 includes an operator of a grid (hereinafter, referred to as a "power system operator 10"), a service provider 20 who controls power supply, and a power user 30 (30a to 30n). This embodiment describes, as an example, a case where the service provider 20 has a frequency regulation device.

The power system operator monitors a frequency of the grid. When determining that the frequency of the grid exceeds a predetermined upper limit or lower limit, the power system operator 10 generates a power instruction value for keeping the frequency of the grid within a predetermined range (also expressed as "suppressing a frequency change"), and transmits the power instruction value to the service provider 20.

It is to be noted that the power system operator 10 has an information processing device 100 which detects a frequency change of the grid and generates a power instruction value.

A reference frequency of a grid is a value determined in each of countries or regions such as 50 Hz and 60 Hz. When a frequency of a grid goes out of a predetermined range from the reference frequency, the frequency change is suppressed. The predetermined range is also a value that is determined in each country or region and is not determined uniformly. The predetermined range is ±0.2 Hz, for instance.

When receiving the power instruction value from the power system operator 10, the service provider 20 transmits a control signal (indicated by a dashed line in FIG. 1) to, among the power users 30a to 30n, the power user 30 having an intention to agree to suppress the frequency change of the grid. The control signal is a signal for instructing a storage battery 400 or load device 500 of each of the power users 30a to 30n to operate.

It is to be noted that the service provider 20 has a control device 200 which generates a control signal for suppressing the frequency change of the grid, in response to the power instruction value transmitted by the power system operator 10. This embodiment and the following embodiment each give a description assuming that the control device 200 as a frequency regulation device which regulates a frequency of a grid.

The power user 30 is a user or building that consumes power supplied from the grid. The power user 30 is an ordinary household, a condominium, a commercial facility, a building, a factory, a school, a hospital, or a public agency, for instance.

The power user 30 has a storage battery 400, at least one load device 500, and a controller 300 which controls these devices. The load device 500 is a device which generates or consumes power. The load device 500 is a power generator, a heater, a refrigerator, or a pump, for example. In this embodiment, the examples of the load device 500 do not include the storage battery 400.

The controller 300 controls a device through a communication network. When receiving the control signal from the service provider 20, the controller 300 causes each of devices to operate according to an instruction of the control signal. The communication network between the controller 300 and each device may be either a wired network or wireless network, or a combination of these networks.

(Functional Block Diagram)

Figure 2:
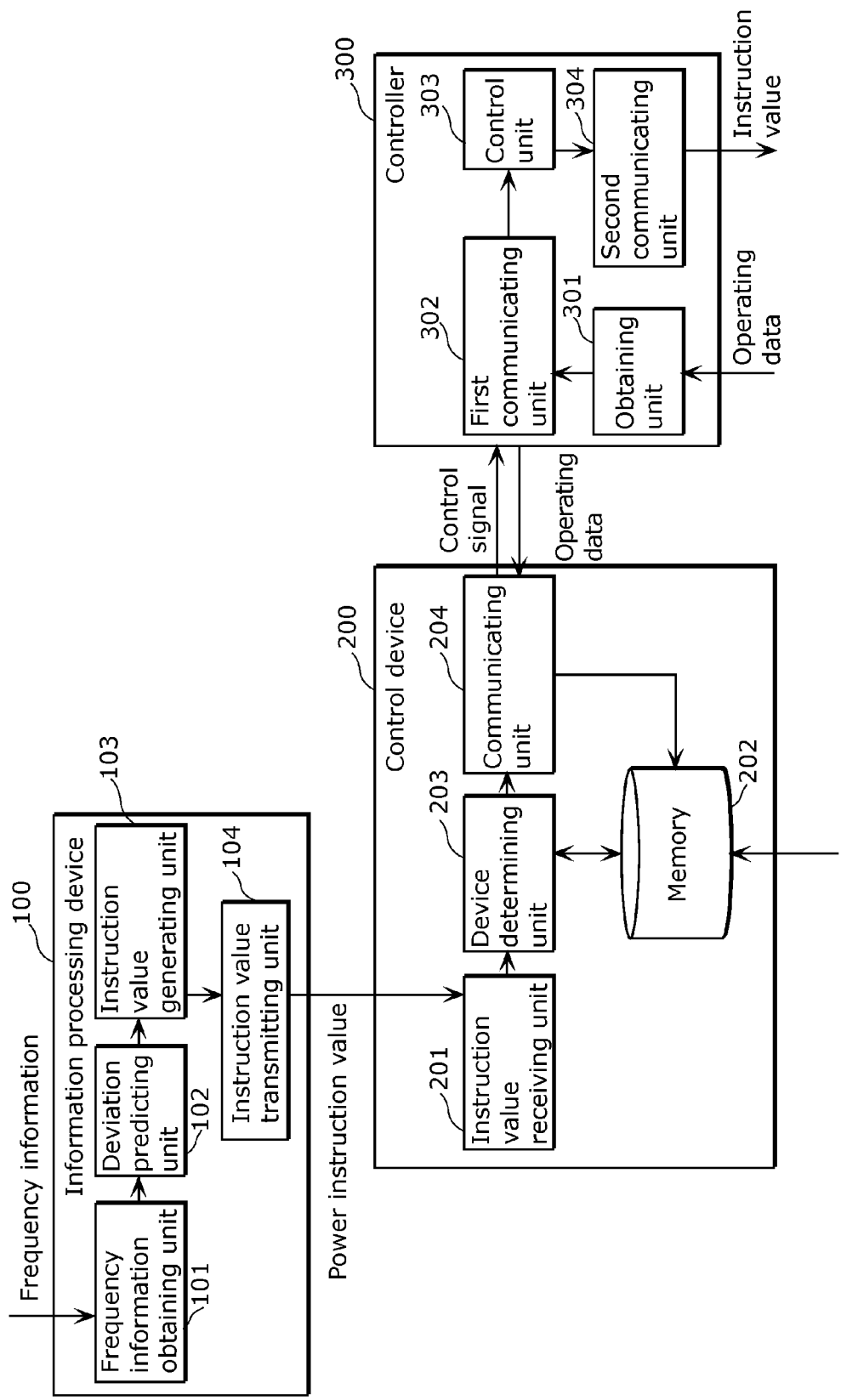
FIG. 2 is a functional block diagram of the frequency regulation device according to Embodiment 1 of the present invention.

FIG. 2 is a functional block diagram showing the information processing device 100 of the power system operator 10, the control device 200 of the service provider 20, and the controller 300 of the power user 30 in the system according to this embodiment.

(Functional Block of Information Processing Device 100)

The information processing device 100 includes a frequency information obtaining unit 101, a deviation predicting unit 102, an instruction value generating unit 103, and an instruction value transmitting unit 104.

The frequency information obtaining unit 101 obtains frequency information of the grid. The frequency information obtaining unit 101 obtains the frequency information through a sensor, for instance.

The deviation predicting unit 102 predicts, from the frequency information obtained by the frequency information obtaining unit 101, a deviation of a frequency of the grid from a reference frequency, and determines whether or not the predicted deviation goes out of a predetermined range. The deviation predicting unit 102 predicts, every two seconds, a frequency change after four seconds.

When determining that the predicted deviation of the frequency of the grid goes out of the predetermined range, the deviation predicting unit 102 transmits, to the instruction value generating unit 103, deviation information such as a deviation amount and a deviation time of the frequency.

When receiving the deviation information from the deviation predicting unit 102, the instruction value generating unit 103 generates a power instruction value for keeping the frequency of the grid within the predetermined range (suppressing the frequency change).

The instruction value transmitting unit 104 transmits the power instruction value generated by the instruction value generating unit 103 to the service provider 20.

(Functional Block of Control Device 200)

The control device 200 includes an instruction value receiving unit (instruction value obtaining unit) 201, a memory 202, a device determining unit 203, and a communicating unit 204.

The instruction value receiving unit 201 receives a power instruction value from the power system operator 10.

The memory 202 stores, for example, operating data of the storage battery 400 and the load device 500 of the power user 30, use schedules for or statuses of use of the storage battery 400 and the load device 500 of the respective power users 30a to 30n, and information indicating an intention of each of the power users 30a to 30n to participate in power frequency regulation. An example of the power frequency regulation is suppressing a frequency change. Exemplary information stored in the memory 202 is described later with reference to FIG. 3.

The device determining unit 203 determines whether or not the load device 500 of each of the power users 30a to 30n is operable in accordance with a power instruction value, based on operating data of the load device 500. In other words, the device determining unit 203 determines whether or not a frequency change can be suppressed by causing the load device 500 of each of the power users 30a to 30n to operate.

When determining that the frequency change can be suppressed by causing the load device 500 to operate, the device determining unit 203 generates a control signal for causing any or all of the load devices 500 to operate, and when determining that the load device 500 is not operable in accordance with the power instruction value, the device determining unit 203 generates a control signal for charging or discharging the storage battery 400.

The communicating unit 204 transmits the control signal generated by the device determining unit 203 to the controller 300.

(Functional Block of Controller 300)

The controller 300 includes an obtaining unit 301, a first communicating unit 302, a control unit 303, and a second communicating unit 304.

The obtaining unit 301 obtains operating data of the storage battery 400 and the load device 500. The operating data is information about power characteristics when a device operates, a rating of each of devices, or power consumption of each device, for example. The obtaining unit 301 may obtain operating data of each device from a manufacturer or operating data measured in each device.

The first communicating unit 302 receives a control signal from the control device 200. In addition, the first communicating unit 302 may transmit, to the control device 200, the operating data of the storage battery 400 and the load device 500 obtained by the obtaining unit 301.

The control unit 303 generates, for each device, an instruction value for controlling the storage battery 400 and the load device 500, based on the control signal received from the control device 200 by the first communicating unit 302.

The second communicating unit 304 transmits, through the communication network, the respective instruction values of the storage battery 400 and the load device 500 to corresponding devices. It is to be noted that the second communicating unit 304 may have the function of the obtaining unit 301. In short, the second communicating unit 304 may further obtain operating data of each device.

The first communicating unit 302 and the second communicating unit 304 may communicate with the control device 200 and each device through any of a wired network and a wireless network, or a combination of these.

FIG. 3 is a diagram showing exemplary data stored in the memory 202 of the control device 200 according to this embodiment.

As shown in FIG. 3, for instance, the memory 202 stores a "user ID" for identifying the power user 30, a "type of device" of the power user 30, "operating data" of each device, a "use schedule" for or a "status of use" of a device of the power user 30, and an intention of the power user 30 to participate in suppressing a frequency change, in association with each other.

The "operating data" includes, for example, "power characteristics data" indicating power characteristics when each device operates, a "rating" of each device, and a "running cost (denoted as "cost" in FIG. 3)" when each device is operated. The "running cost" may include not only an amount of money but also a life of a device or the like.

The characteristics data of each device shown in FIG. 3 is for conceptually describing this embodiment, and does not necessarily indicate accurate characteristics.

[2. Operation]

(Entire Sequence)

Figure 4:
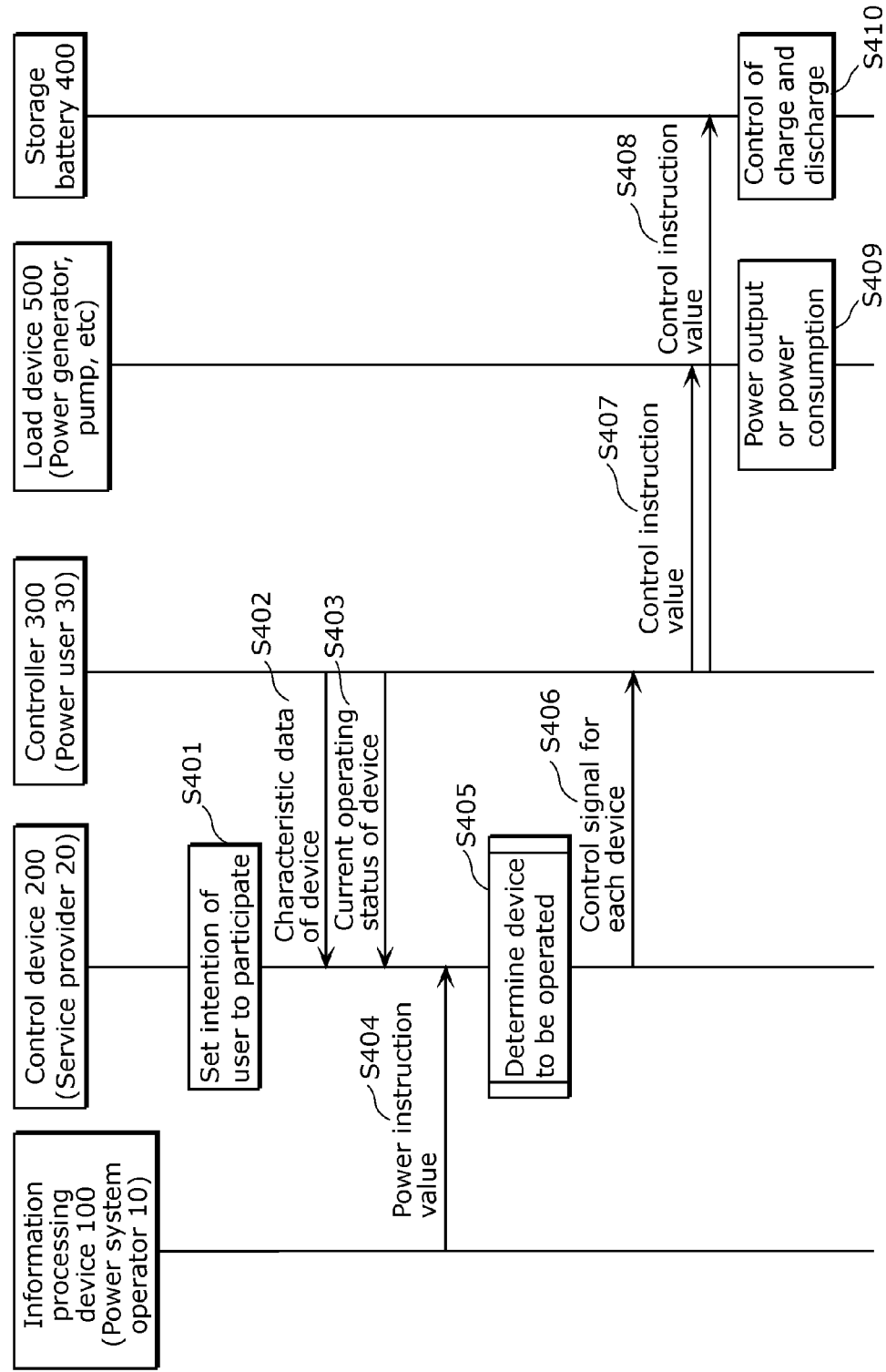
FIG. 4 is a sequence diagram showing exchange of information between devices in Embodiment 1 of the present invention.

FIG. 4 is a sequence diagram showing exchange of information among the information processing device 100, the control device 200, the controller 300, the storage battery 400, and the load device 500 that are used in this embodiment.

The service provider 20 previously asks each of the power users 30a to 30n about an intention to participate which indicates a permission that a device of each of the power users 30a to 30n is controlled to suppress a frequency change (step S401). For example, the service provider 20 asks each of the power users 30a to 30n about the intention to participate, by no later than a predetermined time when power frequency regulation is performed for the power users 30a to 30n.

Next, the control device 200 obtains operating data of devices of each of the power users 30a to 30n (step S402). Before or after step S402, the control device 200 may obtain, from each of the power users 30, the current operating statuses of the storage battery 400 and the load device 500 (step S403).

Subsequently, when receiving a power instruction value from the power system operator 10 (step S404), the control device 200 determines, among the devices of, among the power users 30, one or more power users 30 who have the intentions to participate in step S401, a device to be controlled (step S405).

The control device 200 transmits a control signal for controlling a device to be operated, to the controller 300 of each of the one or more power users 30 (step S406).

Exemplary processing from step S404 to step S406 for the control device 200 is described later with reference to FIG. 5.

Next, after receiving the control signal from the control device 200, the controller 300 transmits an instruction value for causing the load device 500 or the storage battery 400 to operate, based on the received control signal (step S407 and step S408).

The load device 500 operates based on the instruction value from the controller 300 (step S409). For instance, when the load device 500 is a power generator, the power generator generates power based on an instruction value. In contrast, when the load device 500 is a pump, the pump consumes power based on an instruction value.

The storage battery 400 charges or discharges based on the instruction value from the controller 300 (step S410).

(Operations of Control Device 200)

Figure 5:
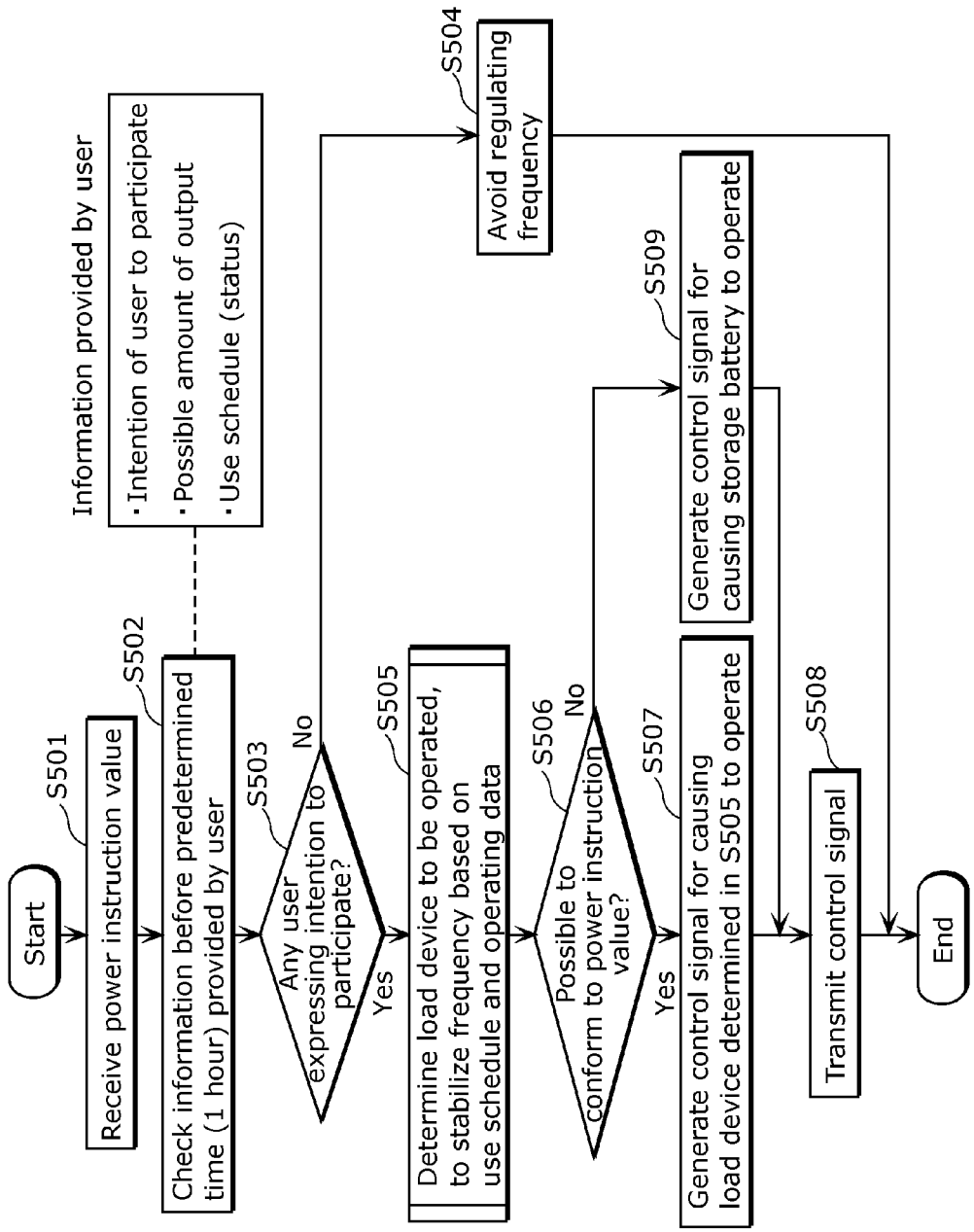
FIG. 5 is a flow chart showing processing of the frequency regulation device according to Embodiment 1 of the present invention.

FIG. 5 is a flow chart showing operations of the control device 200 according to this embodiment.

First, when receiving a power instruction value from the power system operator 10 (step S501), the control device 200 checks information (including, for instance, an intention to participate, a possible amount of output, and a use schedule (status)) before a predetermined time which is provided by each of the power users 30a to 30n (step S502).

The control device 200 determines whether or not any of the power users 30 has the intention to participate (step S503). When determining that none of the power users 30 has the intention to participate (No in step S503), the control device 200 avoids performing regulation for suppressing a frequency change (step S504).

In contrast, when determining that the power user 30 has the intention to participate (Yes in step S503), the control device 200 determines the load device 500 of the power user 30 to be operated to suppress the frequency change of the grid, based on operating data of the load device 500 (step S505). The number of the load devices 500 determined in step S505 may be one or more.

Next, the control device 200 determines whether or not the frequency of the grid can be kept within a predetermined range by causing the load device 500 determined in step S505 to operate (step S506). In other words, the control device 200 determines whether or not power characteristics of the load device 500 can conform to the power instruction value. This determination method is described later with reference to FIG. 6.

When determining in step S506 that the frequency of the grid can be kept within the predetermined range by the power characteristics when the load device 500 is operated (the load device 500 is operable in accordance with the power instruction value) (Yes in step S506), the control device 200 generates a control signal for causing the load device 500 determined in step S505 to operate (step S507), and transmits the control signal to the controller 300 of the corresponding power user 30 (step S508).

In contrast, when determining in step S506 that the frequency of the grid cannot be kept within the predetermined range by the power characteristics when the load device 500 is operated (the load device 500 is not operable in accordance with the power instruction value) (No in step S506), the control device 200 generates a control signal for causing the storage battery 400 of the power user 30 to operate (step S509), and transmits the control signal to the controller 300 (step S508).

Figure 6:
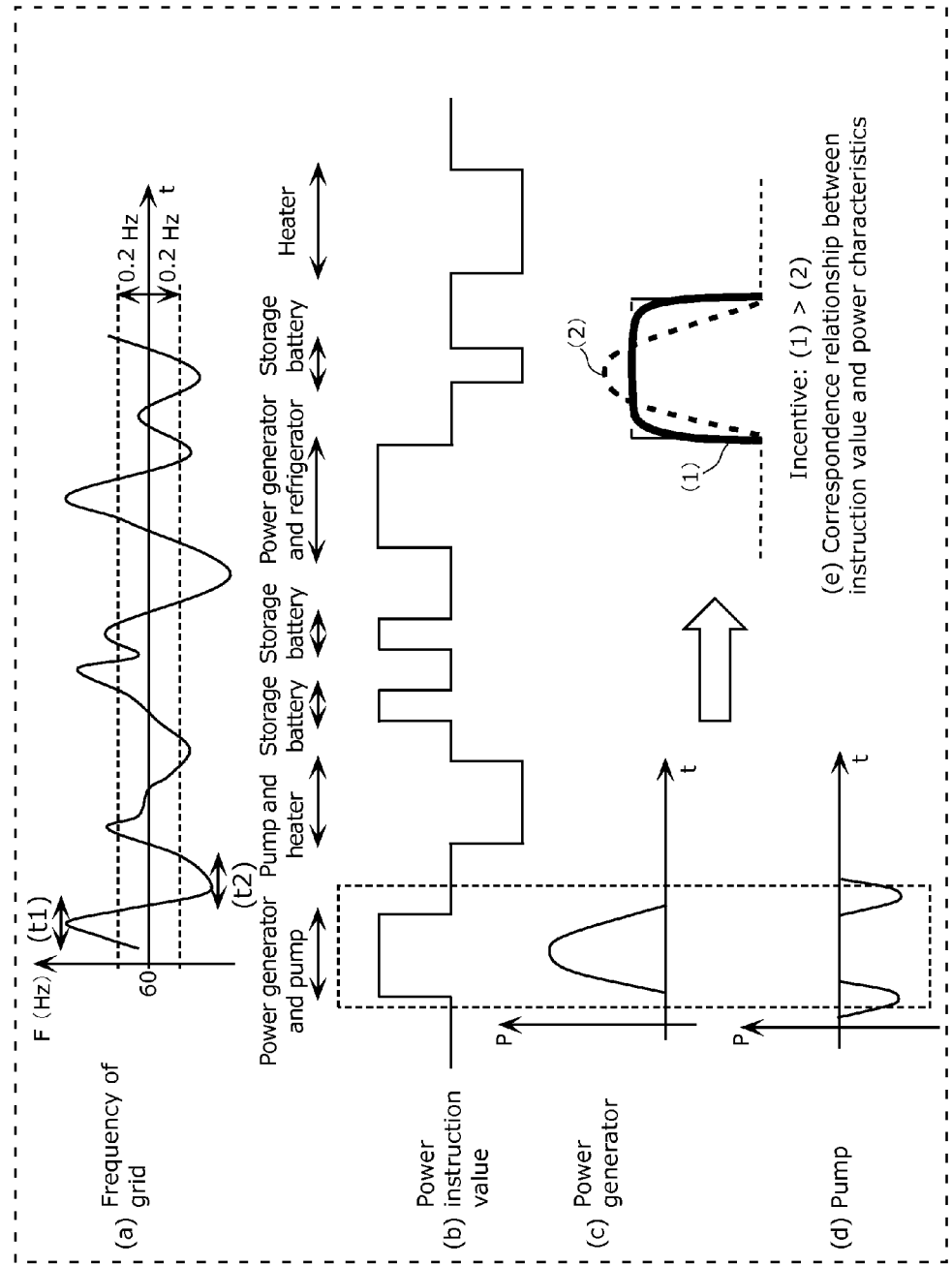
FIG. 6 is a conceptual diagram showing a correspondence relationship between a power instruction value and power characteristics when a load device is operated.

The following describes the method for determining a load device 500 in step S506 shown in FIG. 5 with reference to FIG. 6.

Each of (a) to (e) in FIG. 6 is a conceptual diagram for illustrating a correspondence relationship between power characteristics when the load device 500 is operated and a power instruction value. Each of (a) to (e) in FIG. 6 does not necessarily show an accurate correspondence relationship, and is illustrated as an example for describing this embodiment.

(a) in FIG. 6 is a conceptual diagram showing a frequency change of a grid. (a) in FIG. 6 shows an example where a reference frequency of the grid is 60 Hz, and an acceptable range of the frequency change is ±0.2 Hz. For instance, in a period (t1) shown by (a) in FIG. 6, power in the grid is in surplus, and it is necessary to cause a house of a user to consume the power. On the other hand, in a period (t2) shown by (a) in FIG. 6, power in the grid is in deficit, and it is necessary to supply power.

(b) in FIG. 6 is a conceptual diagram showing a power instruction value generated by the information processing device 100 of the power system operator 10 when the frequency of the grid goes out of a predetermined range.

Each of (c) and (d) in FIG. 6 is a conceptual diagram showing power characteristics when the load device 500 operates.

(e) in FIG. 6 is a conceptual diagram showing a correspondence relationship between power characteristics when the load device 500 shown by (c) in FIG. 6 and the load device 500 shown by (d) in FIG. 6 are operated, and a power instruction value.

When predicting that the frequency of the grid deviates from the reference frequency of 60 Hz by ±0.2 Hz or more ((a) in FIG. 6), the information processing device 100 generates a power instruction value for suppressing the deviation of the frequency ((b) in FIG. 6), and transmits the power instruction value to the control device 200 of the service provider 20.

As shown by (b) in FIG. 6, the power instruction value has a different cycle depending on a deviation amount of the frequency, and includes a long-period instruction value and a short-period instruction value.

Here, it is assumed that a response speed for a power instruction value when the power load device described in this embodiment is operated is slower than a response speed when the storage battery is operated. To put it another way, the response speed of the storage battery has better conformity to the power instruction value than the response speed of the power load device.

The conformity to the power instruction value may be defined as a degree of approximation (degree of deviation) of power characteristics to a waveform of the power instruction value, for example. The device determining unit 203 of the control device 200 may determine that the power characteristics of the load device can conform to the power instruction value, when the degree of approximation is greater than a predetermined threshold value (degree of deviation is low), and may determine that the power characteristics of the load device cannot conform to the power instruction value, when the degree of approximation is less than a predetermined threshold value (degree of deviation is high).

It is to be noted that although (b) in FIG. 6 shows a power instruction value as a rectangular wave, for instance, the power instruction value is not necessarily shown as the rectangular wave.

When receiving the power instruction value shown by (b) in FIG. 6, the control device 200 selects the power load device that can conform to the power instruction value, based on operating data stored in the memory 202.

For example, the control device 200 determines whether or not a load device can conform to a power instruction value using power characteristics including (i) power characteristics of a power generator ((c) in FIG. 6), (ii) power characteristics of a pump ((d) in FIG. 6), or (iii) a combination of (c) in FIG. 6 and (d) in FIG. 6.

As shown by (e) in FIG. 6, comparison between power characteristics (1) indicated by a solid line shown by (e) in FIG. 6 and power characteristics (2) indicated by a dashed line shown by (e) in FIG. 6 as power waveforms generated using any of the (i) to (iii) shows that the power characteristics (1) have a better degree of approximation than the power characteristics (2). Thus, in this case, the control device 200 selects the load device 500 or load devices 500 having the power characteristics (1) as a load device or load devices to be controlled.

On the other hand, in (e) in FIG. 6, when determining that the load devices 500 in combination cannot conform to the power instruction value, the control device 200 causes the storage battery 400 having a higher response speed than the load devices 500 to conform to the power instruction value by charging or discharging the storage battery 400.

Stated differently, the control device 200 causes only the load device 500 to operate in a period when the load device 500 is operable in accordance with the power instruction value, and causes the storage battery to be charged or discharged in a period when the power characteristics of the power load device cannot conform to the power instruction value.

With this, the storage battery 400 is charged or discharged to conform not to all power instruction values but to a short-period power instruction value to which the load device 500 cannot conform, and thus it is possible to stabilize the grid while reducing the number of times the storage battery 400 is charged or discharged (or charge or discharge cycles).

(Modification 1 of Embodiment 1)

Figure 7:
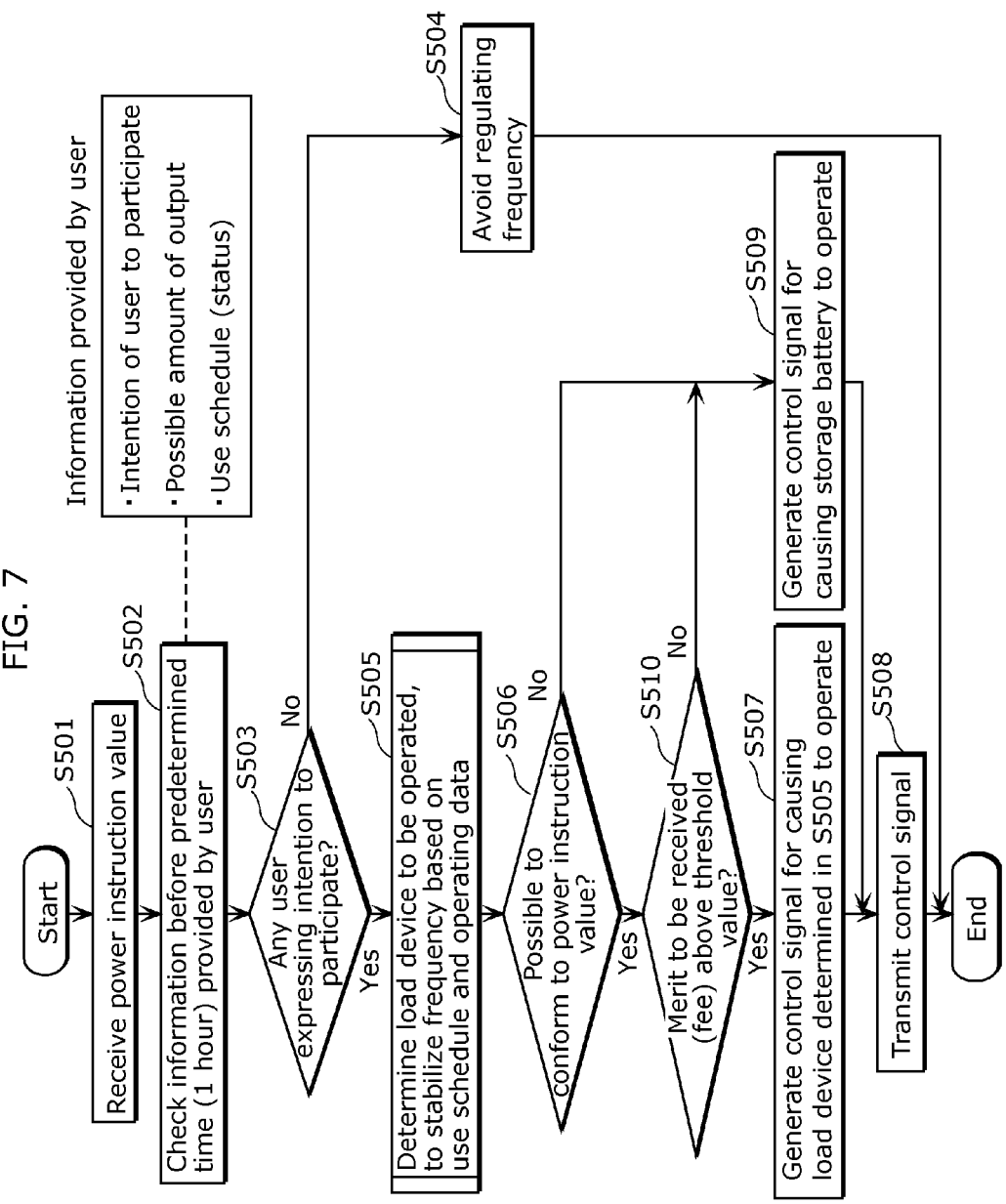
FIG. 7 is a flow chart showing processing of a frequency regulation device according to Modification 1 of Embodiment 1 of the present invention.

FIG. 7 is a flow chart showing operations of the control device 200 according to Modification 1 of Embodiment 1.

In FIG. 5 of this embodiment, when determining in step S506 that the power characteristics of the load device 500 can conform to the power instruction value, the control device 200 generates the control signal for causing the load device 500 to operate.

In this modification, as shown in FIG. 7, after determining in step S506 that the power characteristics of the load device 500 can conform to the power instruction value, the control device 200 further selects the load device 500 to be controlled, based on merits which the power user 30 can receive from the service provider 20 according to suppression of a frequency change.

The respective processes in step S501 to step S509 in FIG. 7 are the same as those in FIG. 5, and thus a detailed description of the steps other than step S510 is omitted.

The control device 200 previously sets an incentive to be given to the power user 30, according to the degree of approximation (degree of deviation) between the power instruction value and the power characteristics of the load device 500. For example, the incentive is set higher for a higher degree of approximation between the power instruction value and the power characteristics (decrease in a degree of deviation). The incentive is not limited in particular, and may be a medium in any format through which the power user 30 can receive merits such as fees and points from the service provider 20.

After determining in step S506 in FIG. 7 that the power characteristics of the load device 500 can conform to the power instruction value, the control device 200 determines whether or not an incentive that the power user 30 can receive depending on the power characteristics of the load device 500 is greater than or equal to a predetermined threshold value (step S510).

When determining that the incentive is greater than or equal to the predetermined threshold value (Yes in step S510), the control device 200 generates a control signal for causing the load device 500 determined in step S505 to operate (step S507), and when determining that the incentive is not greater than or equal to the predetermined threshold value (No in step S510), the control device 200 generates a control signal for causing the storage battery 400 to be charged or discharged (step S509).

(Modification 2 of Embodiment 1)

FIG. 8 is a flow chart showing operations of the control device 200 according to Modification 2 of Embodiment 1. The flow chart of FIG. 8A shows another example of the load device determination processing described for step S505 in FIG. 5 or FIG. 7.

When confirming the presence of the power user 30 having the intention to participate in the frequency regulation in step S503, the control device 200 determines power characteristics of each of the load devices 500 of the power user 30 and power characteristics when the load devices 500 are operated in combination (step S701).

Next, the control device 200 calculates, for each of the power characteristics determined in step S701, merits that the power user 30 can receive, and determines a decreasing order of merits for the power characteristics (step S702). For instance, a difference value between the incentive for each of the power characteristics and a cost when each of the devices is operated is defined as the merits that the power user 30 can receive.

Next, the control device 200 determines whether the load devices 500 currently in use by the power user 30 or the load devices 500 to be used in a regulation period are to be preferentially used (regulation period for suppressing a frequency change) (step S703).

When determining in step S703 that the load devices 500 currently in use or the load devices 500 to be used are to be preferentially used (Yes in step S703), the control device 200 determines, among the load devices 500 currently in use or the load devices 500 to be used, a combination of the load devices 500 which shows power characteristics giving the highest merits to the power user 30 (step S704).

In contrast, when determining in step S703 that the load devices 500 currently in use or the load devices 500 to be used in the regulation period are not to be preferentially used (No in step S703), the control device 200 determines, as the load device to be controlled, the load device 500 having the highest merits among the load devices 500 determined in step S702 or a combination of the load devices 500 (step S705).

Processes subsequent to step S705 are the same as those subsequent to step S506 shown in FIG. 5 or FIG. 7, and a description of the processes is omitted.

(Modification 3 of Embodiment 1)

Modification 3 describes a frequency regulation method in consideration of a state of charge (SOC) of a storage battery (remaining battery level of a storage battery).

An instruction value in the FR is usually kept in balance between a charging side and a discharging side. For example, an amount of charge and an amount of discharge are 100 kWh and 100 kWh, respectively, in conformity to the instruction value in a period such as 30 minutes, and the SOC of the storage battery ideally never changes.

However, the loss of power conversion in charging or discharging the storage battery actually occurs, and thus such an ideal change is not achieved. For instance, assuming that conversion efficiency in each of the charging and discharging is 95%, the power loss of 5 kWh occurs in each of the charging and discharging. As a result, the SOC is reduced by a sum of 10 kWh.

In view of this, the control device 200 reduces power through load control to prevent the discharging of 10 kWh. Stated differently, the control device 200 reduces the power through the load control to cause an SOC at the start of the charging or discharging and an SOC at the end of the same to be equal.

In this case, the control device 200 preferably predicts an amount of charge or discharge in an FR period. In practice, an SOC may vary due to a deviation from prediction, and thus when the SOC of the storage battery is likely to deviate from a predetermined range, that is, the SOC varies dramatically, the control device 200 compensates the deviation by the load control.

(Modification 4 of Embodiment 1)

Although Embodiment 1 has described, as the example, the case where the storage battery is charged or discharged for the short period to which the load control cannot achieve the conformity, as shown in FIG. 8B, both the charging or discharging of the storage battery and the load control may be combined for one frequency instruction. It is to be noted that characteristic data during operation shown by (a) in FIG. 8B are obtained by adding control timing to the data shown in FIG. 3.

In other words, the charging or discharging of the storage battery is used for a range where a frequency instruction value steeply rises or falls, and in stead of the charging or discharging of the storage battery, a load is used for a range in which a rise in the load allows the load to conform to a frequency instruction.

When only the storage battery is used, a response is quick (incentive of FR is high), but the deterioration of the storage battery is accelerated. In contrast, when only a power generator or pump is used, the deterioration of the storage battery is suppressed, but a response is slow (incentive of FR is low).

According to this modification, it is possible to both increase the response speed for the frequency instruction and suppress the deterioration of the storage battery.

(Modification 5 of Embodiment 1)

In Modification 4, furthermore, a frequency instruction value may be predicted, and whether to charge or discharge the storage battery or to perform the load control may be selected.

In addition, whether a received frequency instruction has a long period (low frequency) or short period (high frequency) may be determined by filtering a frequency instruction value.

Embodiment 2

Figure 9:
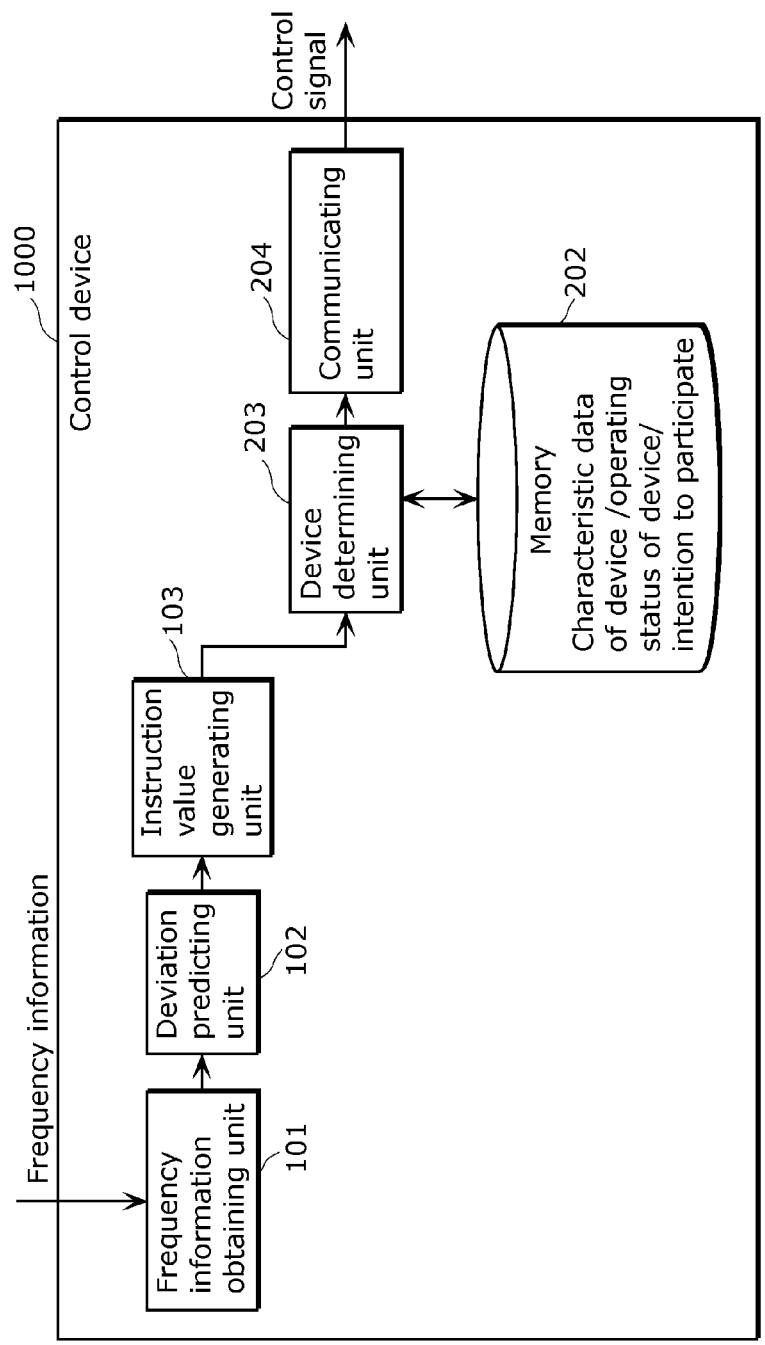
FIG. 9 is a system configuration diagram including a frequency regulation device according to Embodiment 2 of the present invention.

Although Embodiment 1 has described, as having different configurations, the information processing device 100 which detects the frequency change and generates the power instruction value and the control device 200 which determines, among the devices of each of the power users 30, the device to be operated to suppress the frequency change, in response to the power instruction value, the information processing device 100 and the control device 200 do not need to have the different configurations. For instance, as shown in FIG. 9 and FIG. 10, the information processing device 100 and the control device 200 may be provided as one control device 1000.

Figure 10:
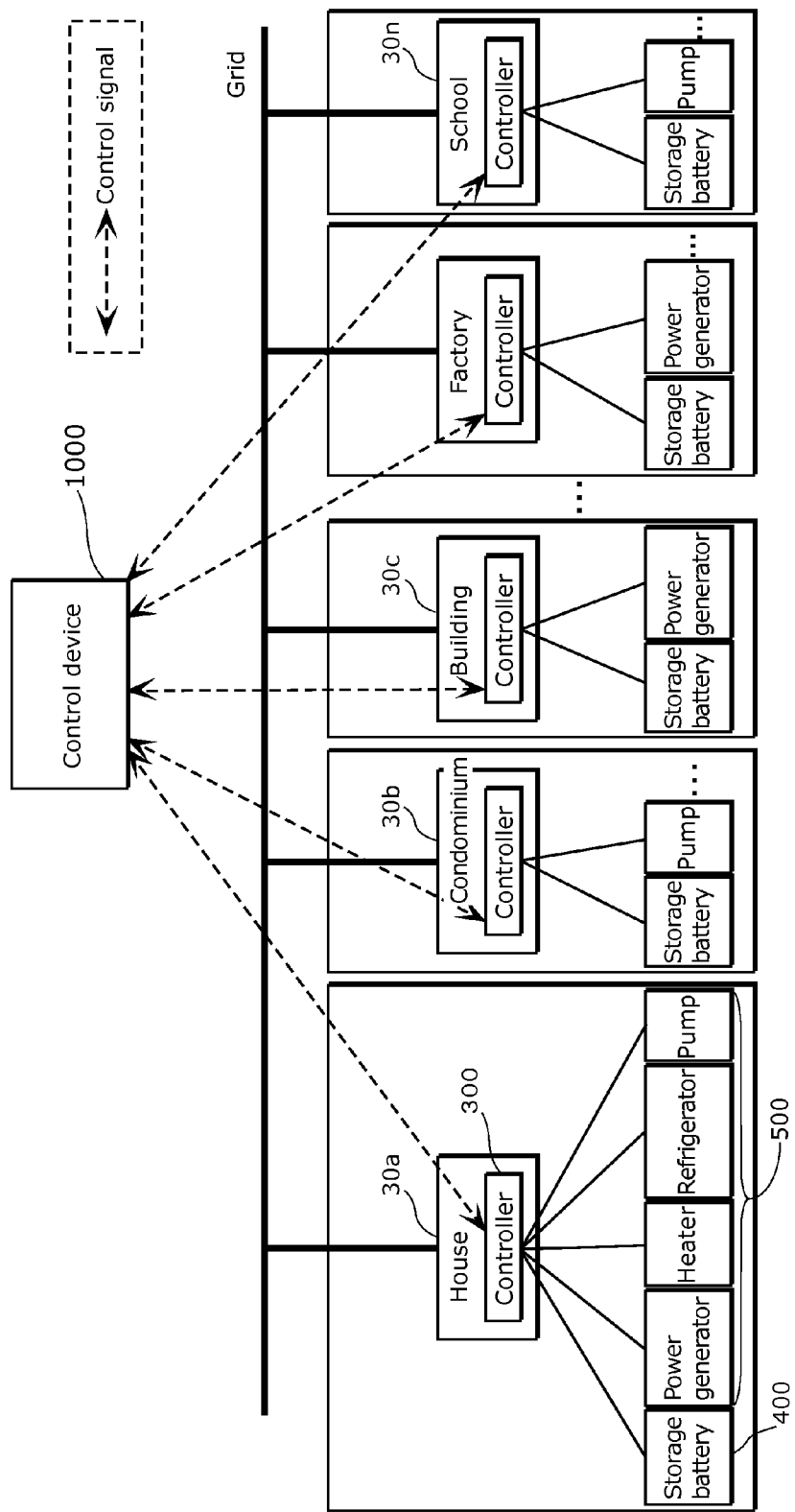
FIG. 10 is a functional block diagram of the frequency regulation device according to Embodiment 2 of the present invention.

In this case, as shown in FIG. 10, the control device 1000 does not need to include the instruction value transmitting unit 104 and the instruction value receiving unit 201 in the functional block diagram of the information processing device 100 and the control device 200 shown in FIG. 2. The instruction value generating unit 103 functions as the instruction value receiving unit 201. The other structural elements have the same functions as the structural elements described for FIG. 2, and a detailed description of the structural elements is omitted.

The embodiments have been described as above. Although each of the embodiments has been described assuming that the control device 200 is the frequency regulation device, the control device 200 can be used as a supply control device which controls power supply of the load device 500 of each of the power users 30.

Moreover, although the case where the power user 30 has the storage battery 400 has been shown as the example in the system configuration diagrams shown in FIG. 1 and FIG. 10, the embodiments of the present invention are not necessarily limited to this case.

Figure 11:
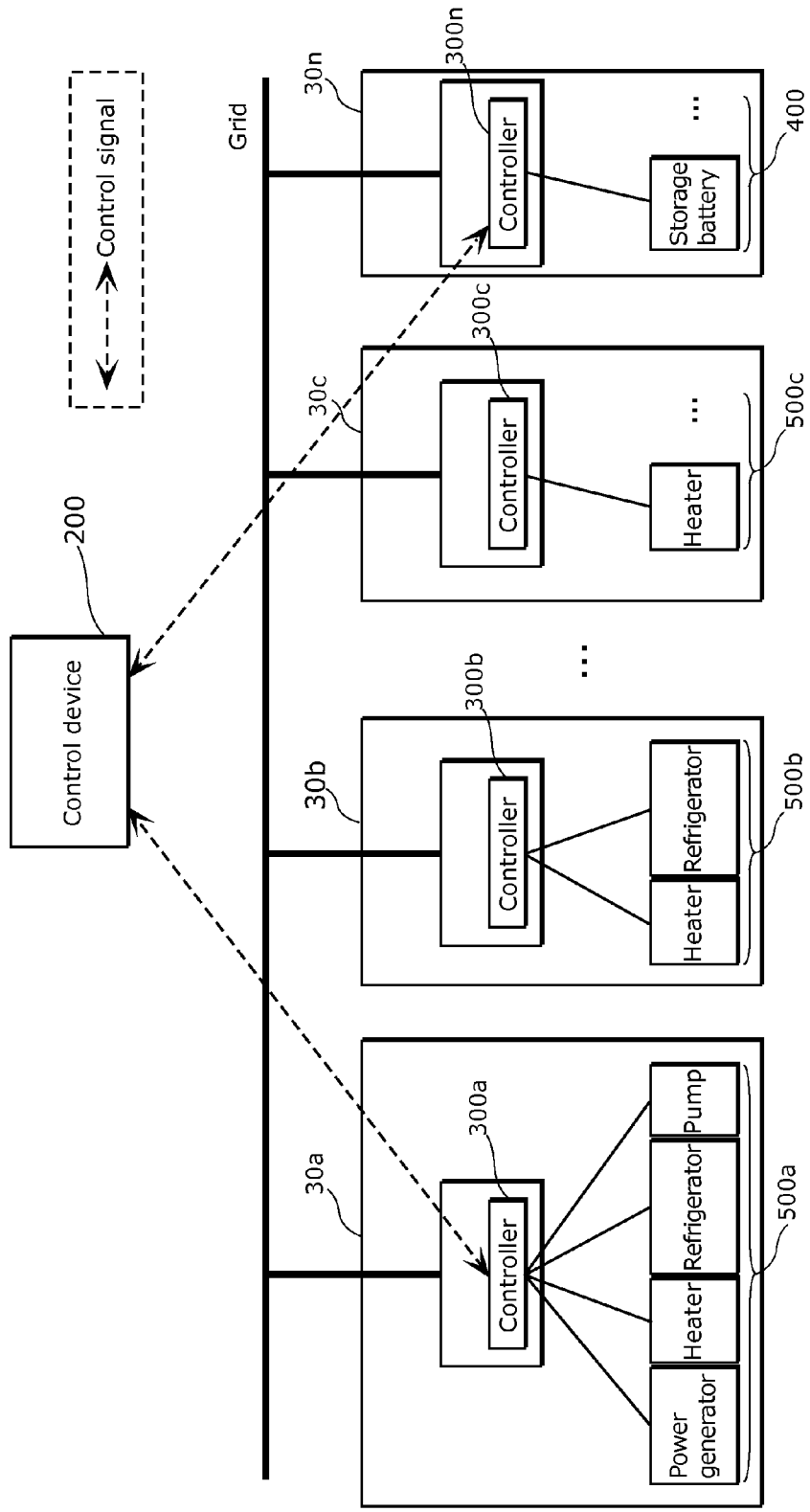
FIG. 11 is an exemplary configuration diagram showing a system in which a frequency regulation device according to each of the embodiments of the present invention is used.

For example, as shown in FIG. 11, each of the power users 30a to 30n does not need to have a storage battery, and a user (building) having a storage battery may be connected to at least one control device 200. In this case, the control device 200 determines whether or not each of load devices 500a to 500n of the power users 30a to 30n can conform to a power instruction value, using power characteristics of the respective load devices 500a to 500n and power characteristics of at least one storage battery.

For instance, when a storage battery is placed in a common use space of a condominium, the control device 200 can use a load device in each of rooms in the condominium and the storage battery in the common use space to regulate a frequency of a grid.

For example, when a storage battery is provided for each of districts such as public offices and public agencies, the control device 200 can use a load device of each of the power users 30 in the respective districts and the storage battery provided for each district, to regulate a frequency of a grid.

INDUSTRIAL APPLICABILITY

The present invention can be applied to a frequency regulation device and a frequency regulation method which make it possible to determine, among load devices and storage batteries of power users, a device to be operated to stabilize a frequency of a grid.

REFERENCE SIGNS LIST

10 Power system operator
20 Service provider
30, 30a, 30b, 30c, 30n Power user
100 Information processing device
101 Frequency information obtaining unit
102 Deviation predicting unit
103 Instruction value generating unit
104 Instruction value transmitting unit
200, 1000 Control device
201 Instruction value receiving unit
202 Memory
203 Device determining unit
204 Communicating unit
300 Controller
301 Obtaining unit
302 First communicating unit
303 Control unit
304 Second communicating unit
400 Storage battery
500, 500a, 500b, 500c, 500n Load device

The invention claimed is:

1. A frequency regulation method for regulating a frequency of a grid by controlling a storage battery system and a load device having power characteristics, the frequency regulation method comprising:

obtaining, when it is detected that a frequency of a grid deviates from a predetermined range, an instruction signal waveform including a power instruction value for keeping the frequency of the grid within the predetermined range;

setting an incentive which is to be offered to a user of the load device to an amount inversely proportional to a degree of deviation between the power characteristics of the load device and the instruction signal waveform;

determining whether the incentive is greater than or less than a predetermined threshold;

generating a first control signal for controlling the load device when it is determined that the incentive is greater than the predetermined threshold, and controlling the load device based on the first control signal; and generating a second control signal for charging or discharging the storage battery system when it is determined that the incentive is less than the predetermined value, and controlling the storage battery system based on the second control signal.

2. The frequency regulation method according to claim 1, comprising causing the load device to consume power supplied from the grid, based on the first control signal, when the degree of approximation to the instruction signal waveform is greater than the predetermined threshold.

3. The frequency regulation method according to claim 2, comprising causing the load device to operate in accordance with the instruction signal by decreasing or increasing an amount of power consumption by the load device, when the load device is caused to operate.

4. The frequency regulation method according to claim 1, wherein the power characteristics used in said determining are power characteristics when the load device operates which are stored in a memory.

5. The frequency regulation method according to claim 4, wherein the memory stores information about respective power characteristics of a plurality of the load devices, the frequency regulation method comprising performing said determining for each of the load devices by combining the power characteristics of the load devices.

6. The frequency regulation method according to claim 1, comprising controlling the load device when a cycle in which power corresponding to the power instruction value is exchanged with the grid is greater than or equal to a predetermined value, and charging or discharging the storage battery system when the cycle is less than the predetermined value.

7. The frequency regulation method according to claim 1, comprising controlling the load device upon obtaining the instruction signal, and causing the storage battery system to charge or discharge differential power relative to the power instruction value when the differential power is present relative to the power instruction value even in a case where the load device is controlled in a period when power corresponding to the power instruction value is exchanged between the load device and the grid.

8. The frequency regulation method according to claim 1, comprising controlling the load device to cause a remaining battery level of the storage battery system at an end of a frequency regulation period to reach a predetermined target value, the frequency regulation period being a period when a frequency of the grid is regulated.

9. The frequency regulation method according to claim 8, comprising controlling the load device to cause the remaining battery level of the storage battery system at the end of the frequency regulation period to reach the predetermined target value, by controlling the load device to compensate power conversion loss of the storage battery system in the frequency regulation period.

10. The frequency regulation method according to claim 8, wherein the predetermined target value is a remaining battery level of the storage battery system at a start of the frequency regulation period, the frequency regulation method comprising controlling the load device to cause the remaining battery levels of the storage battery system at the start and end of the frequency regulation period to be equal.

11. The frequency regulation method according to claim 1, for use with a plurality of load devices, said method comprising:

selecting a combination of said plurality of load devices having a highest incentive; and generating the first control signal for controlling the selected combination of load devices when it is determined that the degree of approximation of the combined power characteristics to the instruction signal waveform is greater than the predetermined threshold, and controlling the selected combination of load devices based on the first control signal.

12. The frequency regulation method according to claim 1, wherein the load device is at least one of a household appliance, a pump, a heater, and a refrigerator.

13. A frequency regulation system which regulates a frequency of a grid, the frequency regulation system comprising:

a storage battery system; and a server which generates a control signal for controlling the storage battery system and a load device having power characteristics, wherein the server includes:

a communicating unit configured to communicate with the storage battery system;

an obtaining unit configured to obtain, when it is detected that a frequency of a grid deviates from a predetermined range, an instruction signal waveform including a power instruction value for keeping the frequency of the grid within the predetermined range;

a control unit configured to (i) determine whether a degree of approximation, of the power characteristics of the load device, to the instruction signal waveform is greater than or less than a predetermined threshold, (ii) generate a first control signal for controlling the load device when it is determined that the degree of approximation to the instruction signal waveform is greater than the predetermined threshold, and control the load device based on the first control signal, (iii) generate a second control signal for charging or discharging the storage battery system when it is determined that the degree of approximation to the instruction signal waveform is less than the predetermined value, and transmit the generated second control signal to the storage battery system through the communicating unit, (iv) set an incentive which is to be offered to a user of the load device to an amount inversely proportional to a degree of deviation between the power characteristics of the load device and the instruction signal waveform; and the storage battery system includes:

at least one storage battery;

a receiving unit configured to receive the second control signal; and a control unit configured to control charging or discharging of the storage battery based on the received second control signal and charging or discharging the storage battery system when the incentive is less than a predetermined threshold value.

14. A server comprising:

a communicating unit configured to communicate with a storage battery system;

an obtaining unit configured to obtain, when it is detected that a frequency of a grid deviates from a predetermined range, an instruction signal waveform including a power instruction value for keeping the frequency of the grid within the predetermined range; and a control unit configured to (i) determine whether a degree of approximation, or power characteristics of a load device, to the instruction signal waveform is greater than or less than a predetermined threshold, (ii) generate a first control signal for controlling the load device when it is determined that the degree of approximation to the instruction signal waveform is greater than the predetermined threshold, and control the load device based on the first control signal, (iii) generate a second control signal for charging or discharging the storage battery system when it is determined that the degree of approximation to the instruction signal waveform is less than the predetermined value, and transmit the generated second control signal to the storage battery system through the communicating unit, (iv) set an incentive which is to be offered to a user of the load device to an amount inversely proportional to a degree of deviation between the power characteristics of the load device and the instruction signal waveform, and (v) charging or discharging the storage battery system when the incentive is less than a predetermined threshold value.

15. A frequency regulation method for regulating a frequency of a grid by controlling a storage battery system and a load device having power characteristics, the frequency regulation method comprising:

obtaining, when it is detected that a frequency of a grid deviates from a predetermined range, an instruction signal waveform including a power instruction value for keeping the frequency of the grid within the predetermined range;

setting an incentive which is to be offered to a user of the load device to an amount inversely proportional to a degree of deviation between the power characteristics of the load device and the instruction signal waveform;

determining whether the incentive is greater than or less than a predetermined threshold;

generating a first control signal for controlling the load device so that the load device operates in accordance with the instruction signal, when it is determined that the incentive is greater than the predetermined threshold, and controlling the load device based on the first control signal;

generating a second control signal for charging or discharging the storage battery system so that the storage battery system operates in accordance with the instruction signal, when it is determined that the incentive is less than the predetermined value, and controlling the storage battery system based on the second control signal.

* * * * *